(12) United States Patent
McNeil

(10) Patent No.: US 7,210,537 B1
(45) Date of Patent: May 1, 2007

(54) METHOD OF CONTROLLING FIRES

(76) Inventor: Steven D. McNeil, 899 Kane St., South Elgin, IL (US) 60177-1434

( * ) Notice: Subject to any disclaimer, the term of this patent is extended or adjusted under 35 U.S.C. 154(b) by 746 days.

(21) Appl. No.: 10/057,075

(22) Filed: Jan. 23, 2002

(51) Int. Cl.
*A62C 2/00* (2006.01)
(52) U.S. Cl. .......................... 169/46; 169/45; 169/47; 169/49; 169/52; 169/68; 169/70; 102/302
(58) Field of Classification Search ................. 169/24, 169/45, 46, 47, 54, 62
See application file for complete search history.

(56) References Cited

U.S. PATENT DOCUMENTS

| | | | | |
|---|---|---|---|---|
| 3,698,380 A | * | 10/1972 | Cook .................. | 126/271.2 A |
| 3,720,166 A | * | 3/1973 | Sewell et al. ............... | 102/302 |
| 3,805,766 A | * | 4/1974 | Hammon ............. | 126/271.2 R |
| 3,833,064 A | * | 9/1974 | Ranney, Jr. .................. | 169/52 |
| 3,897,829 A | | 8/1975 | Eason .......................... | 169/53 |
| 3,938,441 A | * | 2/1976 | Sewell et al. ............... | 102/474 |
| 3,951,066 A | | 4/1976 | Schroeder .................... | 102/65 |
| 4,285,403 A | * | 8/1981 | Poland ........................ | 169/28 |
| 4,344,489 A | * | 8/1982 | Bonaparte .................... | 169/70 |
| 4,616,711 A | * | 10/1986 | Johnson ....................... | 169/45 |
| 5,050,683 A | * | 9/1991 | Sayles .......................... | 169/46 |
| 5,165,482 A | * | 11/1992 | Smagac et al. ............... | 169/45 |
| 5,214,867 A | * | 6/1993 | Weatherly et al. ............ | 37/357 |
| 5,507,350 A | * | 4/1996 | Primlani ...................... | 169/47 |
| 5,626,194 A | * | 5/1997 | White .......................... | 169/24 |
| 5,739,461 A | * | 4/1998 | Jacobson .................... | 102/338 |
| 6,142,238 A | * | 11/2000 | Holt et al. .................... | 169/47 |

FOREIGN PATENT DOCUMENTS

WO  PCT/AU02/00854  * 7/2002

* cited by examiner

*Primary Examiner*—Dinh Q. Nguyen
(74) *Attorney, Agent, or Firm*—Schwartz Cooper Chartered

(57) ABSTRACT

A forest fire is brought under control and extinguished through the use of ordnance to create a fire break. The fire break location is chosen along a front in the direction of travel of the fire. Ordnance is used to quickly knock down trees and other potential fuel for the fire. The fuel is then removed from the fire break. A back burn is optionally used to further create a fire break. The back burn is ignited using ordnance. Mop-up operations make use of ordnance to expose and disperse smoldering fuels by exploding hot spots.

3 Claims, 2 Drawing Sheets

METHOD OF CONTROLLING FIRES

TECHNICAL FIELD

The present invention relates to a system and method for controlling the spread of forest fires, and more particularly, to a system and method for both removing trees and other fuel from the fire area and then optionally creating a back burn towards the fire area using ordnance.

BACKGROUND

Fires in wooded areas present issues of tremendous concern and are a serious problem. All too frequently large forest fires rage out of control. These fires sweep through forests, woodlands, and communities, resulting in loss of forests, homes, other flammable property, animals and even human life. Efforts employed to contain wildfires are not always successful. Controlling and preventing the spread of forest fires is often a difficult undertaking, fraught with frustration and danger. Furthermore, where the fire is spread over a sizable area, additional problems exist inasmuch as the area to protect can grow in intensity and size at a tremendous rate. The result often is that the fire will spread quickly in multiple directions. Dry and/or windy conditions compound these problems and further complicate efforts to control a fire safely.

There are presently accepted methods and techniques for controlling and preventing the spread of fires. These methods include traditional uses of firefighters and equipment, including such techniques as the dumping of large amounts of water or fire suppressing chemicals from aircrafts onto the fire, creating fire lines across the direction of travel of the fire, spraying water or fire suppressing chemicals on to the fire by firefighters on the ground, and back burning an area towards the fire in a controlled manner so as to effectively remove wood or other sources of fuel from an approaching fire.

Dumping water or chemicals from aircraft is expensive, time consuming, and at times inefficient or ineffective. This is due, at least in part, to the fact that one has to have access to water, means to retrieve the water, and means for delivering the water onto the fire. These are serious obstacles because forest fires often occur in remote and dry locations.

While the creation of fire lines is an effective way of controlling the spread of a fire, it has inherent difficulties in that it is very manpower intensive. Creation of a fire line involves the removal of trees or other burnable materials, which are often fixed in place. While this can be more easily accomplished through the use of bulldozers or other heavy machinery, these machines are expensive and often not available where they are needed. Additionally, wildfires often occur in remote locations where it is simply impossible to transport heavy machinery due to a lack of suitable roads.

With respect to the traditional firefighting method of using a controlled back burn to augment a fire line, this method is too often rendered ineffective by special geographical conditions and the dangers posed by the approaching fire. Back burning is typically used adjacent to a fire line created in front or along the flanks of an approaching fire. Therefore, for a back burn to be effective it presupposes the existence or a manmade or naturally occurring fire line. As discussed above, difficulties are inherent in creating such a fire line. Additionally, starting a back burn is itself a procedure fraught with peril for the individual on the ground who must start the fire.

The application of water or fire suppressing chemicals to a fire from the ground remains an effective technique where sufficient manpower and water/chemicals are available. However, transporting the required amounts of water or chemicals is difficult. The terrain in which many forest fires occur is frequently not conducive to transporting large quantities of these substances due to a lack of roads. Additionally, the application of these substances from the ground requires firefighters to come into close proximity with the fire, creating a risk of injury or even death.

In summary, there is still a great need for new approaches and techniques to contain, control, and extinguish forest fires.

SUMMARY OF THE INVENTION

According to the present invention, a wildfire is brought under control by the use of ordnance to remove fuel in order to create a fire line. While the fire line is being created, or after it has been created, a back burn is started to burn off fuel located between the fire and the fire line to effectively widen the fire line, thereby preventing the fire from leaping the fire line. After the fire is brought under control and during the mopping-up operation, ordnance is used to expose buried smoldering fuel and disperse this fuel by exploding hot spots.

Specifically, pursuant to the present invention, a wildfire is controlled by using ordnance to perform at least one of the firefighting tasks of removing fuel to create a fire line, creating a back burn, or mopping-up the wildfire. A vehicle can be employed to both support and deliver the ordnance. Such vehicles include aircrafts, such as airplanes and helicopters, along with land based vehicles, such as tanks, trucks and cars.

When the wildfire is in a forest of trees, the canopy formed by the trees' leaves and branches can be cut down, severed and knocked down from the trees by firing and directing ordnance into the canopy. Such ordnance can be explosive ordnance or non-explosive ordnance, such as air-to-ground missiles, high-explosive incendiary ammunition, high-explosive bombs, explosive shells, dynamite, non-explosive ammunition, ammonium nitrate charges, magnesium ethylene glycol charges, and ordnance encapsulating flammable liquid.

As to generating a fire line, it can be created between anchor points, in a direction perpendicular to the direction of travel of the wildfire, and/or along the flanks of the direction of travel of the wildfire.

As to creating a back burn, it can be positioned to widen a fire line. In this manner, the fire line is created by using the back burn which is ignited using a flammable liquid explosive.

According to a further aspect of the present invention, ordnance is employed to remove fuel from a line perpendicular to the approach of an oncoming wildfire, thereby creating a fire line, incendiary ordnance devices are employed to create a back burn between the fire line and the approaching fire, thereby widening the fire line; and the mopping up of the fire, after it has been controlled, is accomplished by using explosive ordnance to expose and disperse fuel contained in hot spots within a burned area.

In addition, ordnance from a vehicle can be fired into targets along a line having a direction generally perpendicular to a direction of travel of the wildfire, moving potential fuel for the fire from the line, thereby establishing a fire line.

Such ordnance includes dropping bombs from an aircraft, firing missiles from an aircraft, and/or firing bullets from an aircraft.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawing in which.

DETAILED DESCRIPTION OF THE PREFERRED EMBODIMENT

Figure 1:
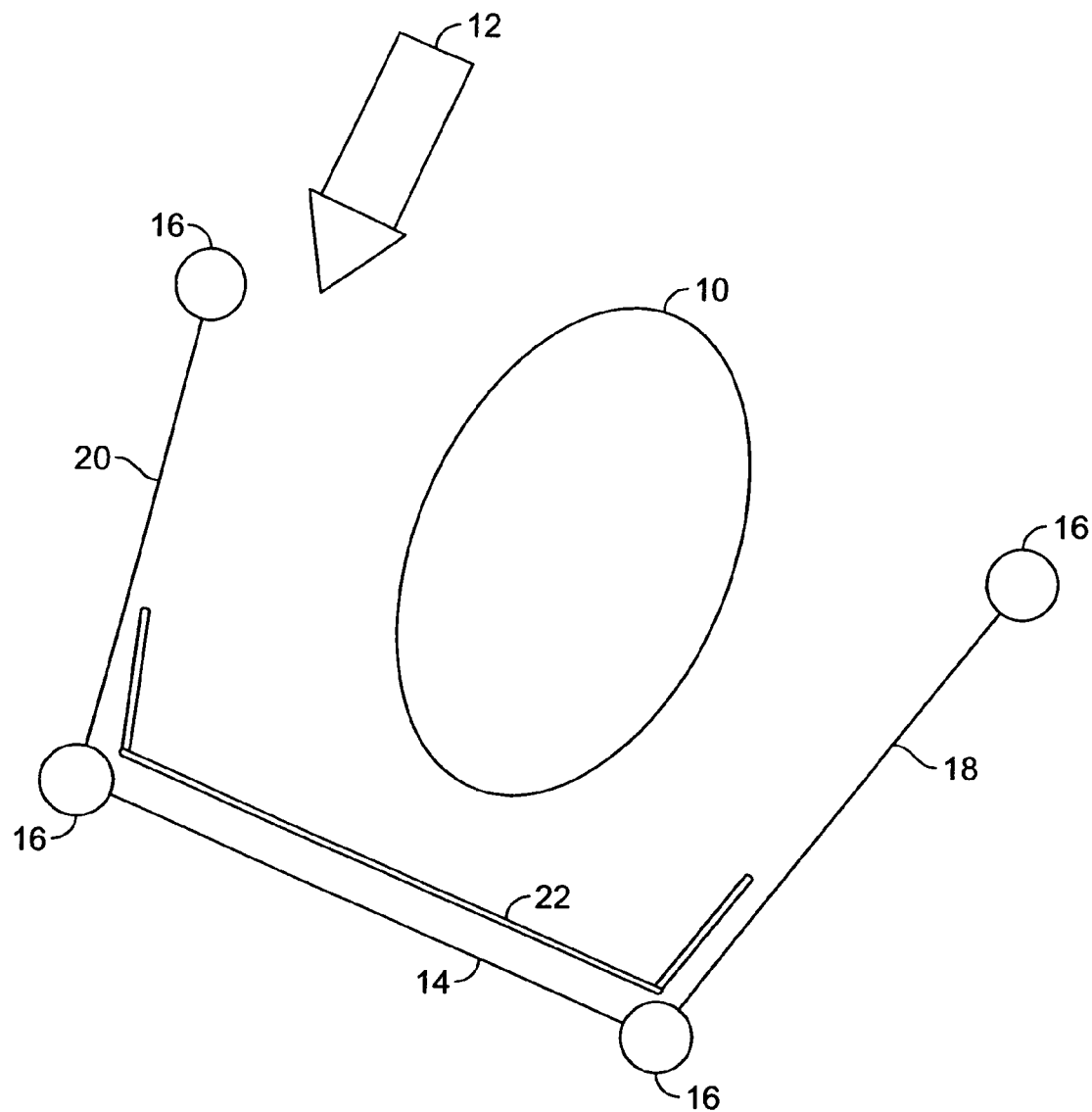
FIG. 1 is a diagram of a wildfire fighting method according to one embodiment of the present invention.

While this invention is susceptible of embodiments in many different forms, there is shown in the drawing and will herein be described in detail, preferred embodiments of the invention with the understanding that the present disclosure is to be considered as an exemplification of the principles of the invention, and is not intended to limit the broad aspects of the invention to the embodiments illustrated.

In one embodiment of the present invention, a wild fire is determined to be present in a particular area. The presence of a wild fire may be determined by a land-based visual observation, as from a lookout tower, a spotter aircraft, by satellite, or by one of the many other methods by which firefighters are alerted to the presence of a wild fire. The presence of a wild fire is then communicated to a control center which begins the process of determining how to control and extinguish the wild fire.

According to one embodiment of the present invention, a control center, upon ascertaining the location of the wildfire will scramble a firefighting force. The make up of the firefighting force is dependent upon the characteristics of the fire, the location of the fire, and the type of terrain in which the fire is located. The forest firefighting force may include such groups as a helitack crew, a smoke jumper crew, or other rapid response type forces. These groups are trained to travel to fires located in remote or inaccessible locations. The helitack crew is a contingent of firefighters who are transported to the scene of a wildfire by a helicopter. Individuals with equipment can be placed on the ground if a suitable landing place can be found for the helicopter, or they may repel out of the helicopter. The helicopter stays on scene after depositing the helitack crew to provide further support. Smoke jumpers are a contingent of firefighters capable of being parachuted from a plane into positions adjacent to a wildfire location. These firefighting forces, upon arriving at the wildfire, but prior to being placed on the ground, scout the fire from the air to determine its size, direction of travel, and speed of travel. In addition, a suitable location to place fire lines is scouted from the air.

FIG. 1 shows a wild fire 10 having a direction of travel as indicated by the wind direction 12. The forest firefighting force selects a location a distance from the fire determined by the speed and direction of travel of the fire so as to allow time to create a fire line 14 before arrival of the fire. The firefighting force is then placed on the ground. The firefighting force, upon being placed on the ground, further determines that the fire line 14 location chosen from the air was correct. A proper fire line requires anchor points 16. An anchor point is a clear area from which the firefighting force can build a fire line. It may be necessary for the firefighting force to clear anchor points 16, or mark the location of suitable anchor points to be later cleared by ordnance. The firefighters then scout the location of the chosen fire line to insure no personnel are present. The firefighters then move to a safe location and indicate to the supporting helicopters or airplanes that they should begin a bombing run. During the bombing run the aircraft drop or fire ordnance along the fire line 14 as directed by the firefighting force.

The ordnance used is dependent on a number of different factors. First, it must be determined what type of fuel needs to be moved by the ordnance. The ordnance is first used to knock down and break apart trees. Depending on the nature of the forest, differing types of ordnance may be required. If the forest is heavily wooded with mature trees, heavy explosives may be needed to clear a fire line through these trees. For example standard military five-hundred or one thousand pound bombs may be needed. The ability of explosives to rapidly knock down the individual trees of a forest allows fire fighters time to move into these areas and remove the fuel, ie. felled trees, branches, and other flammable materials, from the approaching fire.

Simplifying the fire fighters task is the fact that if explosive ordnance is chosen, the violent nature of this ordnance creates a natural break by clearing away plants, trees and other flammable materials exposing the underlying mineral dirt, rocks, and other nonflammable materials by creating a crater. Other ordnance that has been found useful for removing fuel from the fire line includes air-to-ground missiles, high-explosive bombs, explosive shells, dynamite, ammonium nitrate charges, and magnesium ethylene glycol charges.

Figure 2:
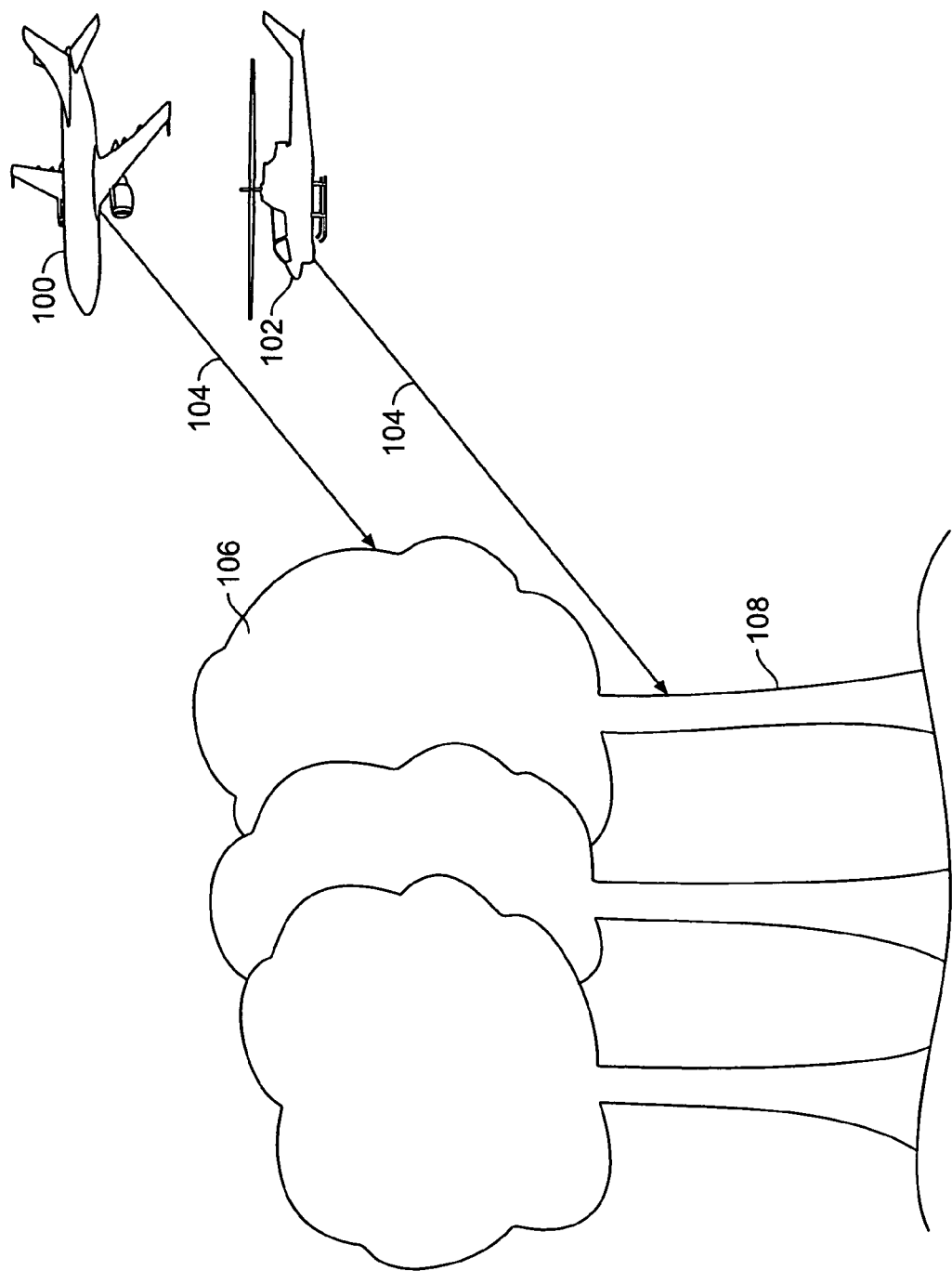
FIG. 2 is a diagram of embodiments of a method of removing canopy from trees.

If large amounts of overhead canopy are present it may be beneficial to concentrate on removing the canopy. A method of doing this is shown in FIG. 2. In the type of forest shown in FIG. 2 it is sometimes easier to remove the canopy alone, instead of the heavier, slower to commence burning fuels such as large tree trunks. This depends in part on the ordnance which is available. If no heavy bombs are available, or if it is desired that craters not be left in the ground, canopy removal should be performed according to this method. This is most effectively done using a airplane 100 or helicopter gunship 102. Examples of canopy removing tools include a Gatling gun, mini-gun, fifty-caliber machine gun, SAW machine gun, or various air to ground explosive missiles. This ordnance 104 is fired into or slightly below the canopy 106 to knock it off of individual trees 108. Explosive ordnance may be used in conjunction with the non-explosive ordnance to accomplish the knocking down of canopy 106.

In some instances, the ordnance will not be completely effective in breaking the trees and other potential sources of fuel for the fire into pieces small enough to be moved by hand. In that case, traditional methods of creating a fire line 14 may be used in addition to the use of ordnance. These tradition methods may include the use of such tools as a chain saw, a shovel, or an axe. It is essential that all of the potential fuel be removed, and it is often necessary to rake or dig into the ground to ensure that nonflammable ground is exposed.

Another factor which must be considered when deciding on the ordnance to use is the width of the fire line 14 that is required. The fire line width is dependent on a number of factors such as fire fuel, topography and fire behavior. Methods of determining the correct width of a fire line are well known in the art. A basic general rule is that the fire line should be at least one and one-half times as wide as the predominant fuel is tall. Once the correct fire line width is determined, an ordnance should be chosen which will ensure the proper fire line width with a minimum of work having to be done by the firefighters following the use of the ordnance. The crater size an explosive will make is dependent, in part, on the characteristics of the ground over which the wild fire 10 is traveling. Heavy rocks and other heavy objects will lessen the crater size of a like size explosion in light soil. If the incorrect ordnance is chosen and the width of the fire line is unacceptable after a first bombing run, a second run may be performed with larger munitions.

After the ordnance has been used to clear an initial fire line 14, the fire-fighting force moves in to finish the fire line 14. A proper fire line 14 extends in a straight line across the direction of travel of the fire 12 perpendicularly. In addition, the fire line should encompass the flanks of the wild fire 10 as shown by the fire lines 18, 20 placed at shallow angles to the direction of travel of the fire. To complete the fire lines 14, 18, 20 the forest firefighting force clears away branches, trees, and other fuel knocked down by the ordnance. Additionally, any trees or other sources of fuel not knocked down by the initial application of ordnance may be removed using conventional methods such as chainsaws, or may be removed by the placement of charges by the firefighting force. Examples of suitable charges for this purpose include dynamite, ammonium nitrate charges, and magnesium ethylene glycol charges. The fire lines 14, 18, 20 created using high explosive ordnance are particularly effective due to the trenches created by the explosions. If the force has access to water or fire retardants, these may be used to improve and expand the width of the fire lines 14, 18, 20. Suitable fire retardants include substances such as ammonium sulphate, diammonium phosphate, or bentonite, among others.

According to one embodiment of the present invention, in addition to the use of fire lines 14, 18,20, a back burn 22 is started. The back burn 22 area is created using flammable ordnance such as high-explosive incendiary ammunition, or ordnance which uses a flammable liquid. The explosive ordnance burns up the fuel required to spread the fire along the ground to undisturbed forest. A back burn 22 is started between the fire 10, and the fire lines 14, 18, 20. The back burn 22 is a controlled burn which effectively widens the fire lines 14, 18, 20 so the fire is unable to cross the lines. Preferably, a back burn 22 will be drawn to the wild fire 10 by a convective column caused by the wild fire 10. This is typical of larger forest fires which are burning vigorously. Smaller fires will not tend to draw the back burn to them, and for these fires care must be taken to employ smaller back burns 22 to avoid the unintended consequence of losing control of the back burn 22.

Once a fire has been brought under control, mop-up operations must be conducted to insure the fire does not rekindle. During mop-up it is important to reach buried pockets of smoldering fuel. In order to do so, in one embodiment of the present invention, high explosive ordnance is detonated within the smoldering pockets of the fire 10, thereby dispersing fuel into smaller pockets which will more quickly extinguish themselves, or can be more easily extinguished using conventional fire fighting techniques such as the application of water or fire suppressing chemicals. The high explosive ordnance is preferably dropped from an aircraft to obviate the need for fire fighters to approach close to the smoldering area, which may be dangerous. The fire fighters indicate the coordinates of the still smoldering area to the aircraft, which then releases the appropriate ordnance. Appropriate ordnance may include bombs or rockets of varying sizes depending on the size of the hot spot to be dispersed. The fire fighters then move in and extinguish the smoldering materials using conventional wild fire fighting techniques.

One advantage of the method of this invention, using ordnance as a tool for fire suppression, is that the reliance on ordnance to remove a great deal of the fuel for the fire cuts down on the number of fire fighters that are necessary on scene. It can be appreciated that having to coordinate and move fewer people means the ability to rapidly deploy a firefighting force is enhanced. This ability to rapidly deploy also means the fire has less chance to grow prior to containment.

In addition to the use of aircraft to deliver ordnance to the fire line 14, 18, 20, back burn 22 area, or mop-up operation, land based delivery means may be used. In areas which are more accessible by roads, it may be possible to bring in tanks, trucks, or cars which are capable of delivering ordnance where necessary. While a tank has means for delivering ordnance mounted on it, a car or truck may be used to transport artillery or other means for delivering ordnance where required.

This method of controlling the spread of forest fires has the potential to save lives, structures, forest, and woodlands. The method of the present invention is both practical and feasible, and has the potential for greatly increasing the effectiveness of existing techniques for controlling forest fires. It is especially effective because it can be carried out by aircraft, thereby expanding its applicability by allowing fires in remote areas to be effectively controlled and extinguished.

The use of ordnance in controlling a fire has inherent risks, and it is essential that proper safety considerations be taken into account when this method is used. One danger is apparent in utilizing this method to control fires that may be adjacent or near to population centers such as towns or cities. In these instances it is preferable to use ordnance from aircraft which have the capability to fly low to the ground and slowly to avoid missing the target. Preferably a helicopter can be used in a situation requiring this type of application of ordnance. Additional possibilities include a "pin-point" strike from a fast moving aircraft with capabilities to fly close to the target area. It is essential that proper coordination is maintained between the firefighters on the ground, and any parties responsible for delivering ordnance to the fire line 14, 18, 20, back burn 22, or mop-up area. Proper training is, of course, essential.

While the specific embodiments have been illustrated and described, numerous modifications can be made without significantly departing from the spirit of the invention, and the scope of protection is only limited by the scope of the accompanying claims.

I claim:

1. A method for controlling a wildfire comprising:
using ordnance to remove fuel from a line perpendicular to the approach of an oncoming wildfire, thereby creating a fire line;
using an incendiary ordnance device to create a back burn between the fire line and the approaching fire, thereby widening the fire line; and
mopping up a fire after it has been controlled by using explosive ordnance to expose and disperse fuel contained in hot spots within a burned area.

2. A method for controlling a wildfire having a tree canopy comprising the steps of using ordnance to perform at least one of the firefighting tasks of a) removing fuel to create a fire line between two anchor points, the fire line being positioned substantially perpendicular to the direction of travel of the wildfire, b) removing fuel to create flank extensions of the fire line originating from the anchor points in a direction generally along a side of the fire or towards the fire and substantially perpendicular to the fire line, c) creating a back burn to widen the fire line, d) mopping-up the wildfire, or e) knocking down the tree canopy while using one or more vehicles supporting ordnance to deliver the ordnance, such vehicles being selected from the group comprising airplanes, helicopters, tanks, trucks and cars and the ordnance being selected from the group comprising air-to-ground missiles, high-explosive ammunition, ammonium nitrate charges, magnesium ethylene glycol charges, and ordnance which uses a flammable liquid.

3. A method for controlling a wildfire having a tree canopy comprising the steps of
   a) employing ordnance to removing fuel to create a fire line between two anchor points, the fire line being positioned substantially perpendicular to the direction of travel of the wildfire;
   b) employing ordinance to remove fuel to create flank extensions of the fire line originating from the anchor points in a direction generally along a side of the fire or towards the fire and substantially perpendicular to the fire line;
   c) employing ordnance to create a back burn to widen the fire line;
   d) employing ordnance to mop-up the wildfire; and,
   e) employing ordnance to knock down the tree canopy,
   all of the above being performed while using one or more vehicles supporting ordnance to deliver the ordnance, such vehicles being selected from the group comprising airplanes, helicopters, tanks, trucks and cars and
   the ordnance employed being selected from the group comprising air-to-ground missiles, high-explosive incendiary ammunition, high-explosive bombs, explosive shells, dynamite, non-explosive ammunition, ammonium nitrate charges, magnesium ethylene glycol charges, and ordnance which uses a flammable liquid.

\* \* \* \* \*